United States Patent

[11] 3,543,797

[72] Inventors William C. McNutt
 Phoenix;
 Bernard C. Goy, Scottsdale, Arizona
[21] Appl. No. 713,624
[22] Filed March 18, 1968
[45] Patented Dec. 1, 1970
[73] Assignee The Garrett Corporation
 Los Angeles, California
 a corporation of California

[54] MULTIPLE BALL VALVE
 11 Claims, 4 Drawing Figs.
[52] U.S. Cl. .................................................. 137/628
[51] Int. Cl. .................................................. F16k 11/10
[50] Field of Search .......................................... 137/628,
 630.19, 601; 251/(Supp Ball Op)

[56] References Cited
UNITED STATES PATENTS
| | | | |
|---|---|---|---|
| 1,558,064 | 10/1925 | Thrift | 251/(Ball Op)UX |
| 1,725,280 | 8/1929 | Kiefer | 251/(Ball Op)UX |
| 1,757,059 | 5/1930 | Rickenberg | 251/(Ball Op)UX |
| 1,805,064 | 5/1931 | Yarnall | 251/(Ball Op)UX |
| 2,177,544 | 10/1939 | Warner | 137/628 |
| 2,192,193 | 5/1940 | Johnson | 137/630.19 |
| 2,967,544 | 1/1961 | Pearsall | 251/(Ball Op)UX |
| 3,204,660 | 9/1965 | Nelson | 137/601X |
| 3,310,069 | 3/1967 | Hoffman | 137/630.19 |

Primary Examiner—Clarence R. Gordon
Attorney—Herschel C. Omohundro and H. Vincent Harsha ABSTRACT: This valve has a casing with an internal chamber and inlet and outlet ports. An internal wall divides the chamber into inlet and outlet sections between which communication may take place through a plurality of openings in the wall, the edges of the wall around the openings serving as seats for a plurality of ball-type valve elements. Means are provided to move the ball valves relative to the seats to control flow through the valve, such means being a solenoid with a headed plunger which engages each of the balls at one side and rolls it off the seat. Resilient means urge the balls toward the closed positions. The head of the plunger is normally spaced a predetermined distance from the balls so that the solenoid core may move initially before impact of the head with the balls. If desired, the seat may be elevated different distances relative to one another so that the balls will be engaged one at a time and the valve opening load will be maintained at a minimum. It is believed, however, that such design need not be intentionally employed since the normally allowable production tolerances would prevent the plunger head from contacting all balls simultaneously.

Patented Dec. 1, 1970

3,543,797

INVENTORS
WILLIAM C. McNUTT
BERNARD C. GOY
BY
Herschel C. Omohundro
ATTORNEY

MULTIPLE BALL VALVE

SUMMARY

This invention relates generally to fluid flow controlling mechanism and more particularly to valves. Still more particularly, the invention relates to valves which are power operated, such as by electricity or fluid pressure.

An object of this invention is to provide a valve which will require a minimum of operating force relative to its flow capabilities and compared to conventional valves with similar capacities.

It is an object of this invention to provide a valve mechanism having, first, a plurality of similar flow-controlling elements which are normally biased in one direction (usually toward closed position) by fluid pressure, and second, actuating means for the flow-controlling elements which will perform the initial opening movement of such elements one after another so that the force requirements may be kept at a minimum.

Another object of the invention is to provide a valve mechanism having a casing with a chamber divided into inlet and outlet sections by a wall with a plurality of ports controlled by a similar number of valve elements, such as balls, and a means for actuating the valve elements to cause them to move off their ports in a particular manner and order.

Still another object of the invention is to arrange the ports and valve elements therefor in a circle and locate the actuating means centrally of the circle so that only one actuator will be required, the ports and valve elements being arranged so that operation of the latter will be successively initiated and will thus require a smaller operating force than if the operations of all were initiated simultaneously.

A further object of the invention is to provide the combination of elements mentioned in the preceding paragraphs with resilient means for urging the valve elements in a closing direction, and to associate such resilient means with the actuating means in such a way that the effect of the closing means will be counteracted, or at least minimized, when the actuating means is performing a valve-opening operation.

Other objects and advantages will be made apparent by the following description and accompanying drawings.

THE DRAWINGS

In the drawings, FIG. 1 is an axial sectional view taken through a valve formed in accordance with the present invention, the valve being illustrated in the closed condition;

DESCRIPTION

Figures 1, 2:
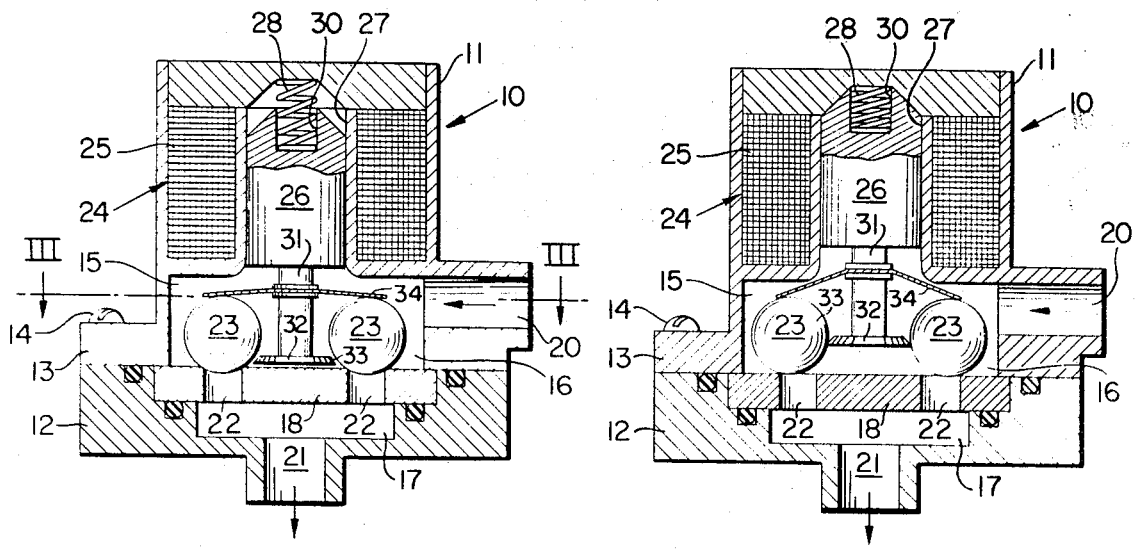
FIG. 2 is a similar view showing the valve in the open condition.
Figure 3:
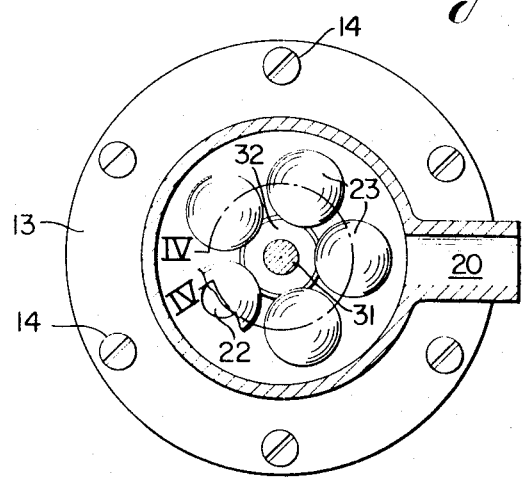
FIG. 3 is a horizontal sectional view taken through the valve on the plane indicated by the line III–III of FIG. 1.

Referring more particularly to the drawings, the valve is indicated generally by the numeral 10. In the form of the invention illustrated, the valve has a casing 11 formed of two parts including a base 12 and cover 13. These elements are secured in the casing forming relationship by suitable fastening elements 14 which pass through a flange on the cover and extend into the base 12. The casing provides an internal chamber 15 which is divided into inlet and outlet sections 16 and 17 by a wall 18. An inlet 20 is provided in the cover 13 and communicates directly with the inlet section 16 of the internal chamber. An outlet 21 is formed centrally of the base 12 and leads from the outlet section 17 of the internal chamber. Communication between the inlet and outlet sections is established by a plurality of openings 22 formed in the wall 18.

In the form of the invention illustrated, the openings 22 are arranged in a circle. The edges of these openings serve as valve seats and may be suitably machined to improve their function as seats. To control flow through the openings, use is made of a plurality of spherical or ball-shaped valve elements 23. Obviously, when these elements are in engagement with the seats, they are also arranged in a circle.

To effect the operation of the valve by the disengagement of the balls 23 from their seats, use is made of a solenoid 24. This component is disposed in the cover 13 and includes a field winding 25 and an armature 26, the cover having a bore 27 formed therein for the slidable reception of the armature. A coil spring 28 is disposed in a socket 30 in the armature; it also engages the end of the bore 27 and tends to move the armature outwardly of the bore 27. The armature has a stem or plunger 31 projecting therefrom into the center of the space between the ball valve elements 23. The end of the plunger has a head 32 provided thereon, this head being of a diameter sufficient to underlie the portions of the ball valves adjacent the plunger. The surface of the head may be beveled, as at 33, for engagement with the valves. When the solenoid coil is energized, the armature 26 will move in opposition to the force of spring 28, causing the head 32 to engage the ball valves at points between the diameters of the valves and the seats. Following such engagement, the continued movement of the head will roll the ball valves over the edges of the seats in a radial direction from the center of the seats and disengage the valve from the seats. Communication between the inlet and outlet sections of the chamber will be established.

It will be noted from FIG. 1 that when the coil of the solenoid is deenergized and the ball valves are in engagement with their seats to close the valve, the head 32 will be spaced slightly from the ball elements. When the coil is energized, a predetermined amount of movement of the armature and head will take place before engagement of the latter with the balls. This movement without load will cause an impact which will quickly unseat the valve elements against the force of fluid pressure in the inlet section of the chamber. When the coil is deenergized, spring 28 will move the armature outwardly of the bore to permit the ball valves to reengage their seats under the force of fluid pressure. This seating movement may be assisted by leaf spring means 34 secured to the stem 31 and projecting over the ball elements for engagement therewith during outward movement of the armature. The spring may be biased slightly toward the ball elements to exert a resilient closing force thereon following the movement of the armature by the spring 28. This force is removed or decreased by the upward movement of the armature following energization of the coil.

It will be noted from FIG. 2 that when the ball valves are disengaged from their seats, they are rolled slightly in an outward direction, but the centers of the balls are still within the circumference of the valve seats. When the solenoid is deenergized, the ball elements will move inwardly under the influence of fluid pressure to be positioned over the head 32 of the plunger. The extent of movement of the armature in a valve-opening direction is limited to prevent the head 32 from passing the greatest diameter of the ball elements.

As pointed out in the objects, the plurality of ball elements is provided to reduce the force required to actuate the valve. This force is also reduced by causing the head 32 to engage the balls at one side of the center thereof to provide leverage.

Figure 4:
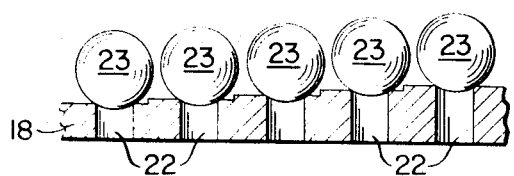
FIG. 4 is a developed sectional view taken through the valve on the line IV–IV of FIG. 3.

It is also within the concept of the invention to further reduce the actuating force required by causing the head to engage the balls and initially move them from their seats one at a time. This function may be performed in several ways, such as forming the head 32 in a particular manner, or, as illustrated in FIG. 4, by forming the seats at different elevations relative to the plunger. In FIG. 4, each seat is at a different elevation than the other seats. When the solenoid is energized to open the valve, the head will progressively engage the balls to initially remove them from the seats. The operating force will thus be reduced.

While the valve has been illustrated with the seats and balls arranged in a circle, it is obvious that the concept of the invention is broad enough to cover other arrangements. FIG. 4 has been described as being a developed view. It should be clear, however, that the valve might be built with the seats and balls arranged in a line, as shown in FIG. 4, if desired. A suitably designed actuating means would than be required.

We claim:

1. A valve mechanism, comprising:
   a. means forming a casing having an internal chamber with inlet and outlet ports;
   b. a flat wall member dividing the chamber into inlet and outlet sections, said wall member having a plurality of spaced openings arranged in a circle with the axes of the openings normal to top and bottom surfaces of said wall member, said openings establishing communication between said inlet and outlet chamber sections, the edges of the wall member around such openings serving as valve seats;
   c. a separate valve element cooperating with the seat around each opening to control fluid flow therethrough, portions of said valve elements overhanging said valve seats; and
   d. means operative to move said valve elements toward and away from said seats, said means having an actuator movable toward and away from said wall member with a valve-engaging head disposed between said wall member and portions of the valve elements overhanging the valve seats.

2. The valve mechanism of claim 1 in which the means for moving the valve elements away from the seats is arranged to initiate such movement of said valve elements one at a time.

3. The valve mechanism of claim 1 in which the valve elements are at least partially spherical and the valve-engaging head is smaller in diameter than the circle of openings but larger in diameter then the space between the valve elements at their maximum diameters.

4. The valve mechanism of claim 3 in which the means for moving the valve elements away from the seats is arranged to roll each element in a radial direction relative to its seat.

5. The valve mechanism of claim 3 in which the means for moving the spherical valve elements is disposed to engage each element at one side between the greatest diameter and the seat for the element.

6. The valve mechanism of claim 5 in which the means for moving the valve elements includes a solenoid.

7. The valve mechanism of claim 6 in which the solenoid includes a plunger disposed in the center of the circular arrangement of spherical valve elements and provided with a head member for engaging such valve elements between the greatest diameters and the seats for such elements.

8. The valve mechanism of claim 7 in which the seats are at different elevations relative to the valve-engaging member to vary the initial opening movement of the valves relative to each other.

9. The valve mechanism of claim 6 in which resilient means are provided to urge said valve elements toward their seats.

10. The valve mechanism of claim 9 in which said resilient means are connected with said solenoid and operative upon deenergization of said solenoid to move said valves toward closed positions.

11. The valve mechanism of claim 7 in which the valve engaging member is normally spaced from the valve elements in the closed positions thereof to provide initial movement of the solenoid armature prior to valve movement.